United States Patent
Maitra et al.

(10) Patent No.: US 12,093,990 B2
(45) Date of Patent: Sep. 17, 2024

(54) METHOD AND SYSTEM FOR SECURE ELECTRONIC SHOPPING CART TRANSFER AND MERGE

(71) Applicant: TARGET BRANDS, INC., Minneapolis, MN (US)

(72) Inventors: Saikat Maitra, Minneapolis, MN (US); Sahidur Rahman, Minneapolis, MN (US); Andrew Rudge, Minneapolis, MN (US); Nesrin Balioglu, Minneapolis, MN (US); Timothy Johnson, Minneapolis, MN (US); Eduardo Coll, Minneapolis, MN (US); Steve Bennett, Minneapolis, MN (US); Ravindereddy Bandi, Minneapolis, MN (US); Timothy Hruska, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 75 days.

(21) Appl. No.: 17/582,935

(22) Filed: Jan. 24, 2022

(65) Prior Publication Data
US 2023/0237555 A1    Jul. 27, 2023

(51) Int. Cl.
G06Q 30/00        (2023.01)
G06Q 20/38        (2012.01)
G06Q 30/0601      (2023.01)

(52) U.S. Cl.
CPC ....... G06Q 30/0633 (2013.01); G06Q 20/383 (2013.01); G06Q 30/0643 (2013.01); G06Q 2220/00 (2013.01)

(58) Field of Classification Search
CPC ........... G06Q 30/0633; G06Q 30/0641; G06Q 20/12; G06Q 20/401; G06Q 30/0601;
(Continued)

(56) References Cited

U.S. PATENT DOCUMENTS 6,101,482  A       8/2000  DiAngelo et al.
8,548,872  B1 *   10/2013  Gupta ................ G06Q 30/0206
                                                        705/26.1

(Continued)

FOREIGN PATENT DOCUMENTS

EP    4030687  A1 *   7/2022    ......... H04L 63/0421

OTHER PUBLICATIONS

Trieu C. Chieu, Florian Pinel, Jih-Shyr Yih, "Unified Commerce Server Architecture for Large Number of Enterprise Stores, " 2004, Proceedings. IEEE International Conference on e-Commerce Technology, pp. 93-100 (Year: 2004).*

*Primary Examiner* — Marissa Thein
*Assistant Examiner* — Zachary T. Shuckrow
(74) *Attorney, Agent, or Firm* — HSML P. C.

(57)  ABSTRACT

Methods and systems for securely transferring and merging an electronic shopping cart curated by an affiliate online service for purchase on a retailer online service is disclosed. The retailer online service provides an anonymous token to the affiliate online service that allows the affiliate online service to curate an anonymous electronic shopping cart for a user that does not include any identifying information that links the user to a guest account of the retailer online service. When the user is redirected from the affiliate online service to the retailer online service, the anonymous token is validated. Upon validation of the anonymous token, the retailer online service obtains identifying information linking the user to the guest account of the retailer online service and obtain a pre-existing electronic shopping cart linked to the guest account. The retailer online service then merges the anonymous electronic shopping cart with the pre-existing electronic shopping cart.

18 Claims, 10 Drawing Sheets

(58) Field of Classification Search
CPC .. G06Q 30/06; G06Q 30/0643; G06Q 20/383;
G06Q 2220/00; G06Q 30/0635
USPC .................................... 705/26.8–26.81, 27.1
See application file for complete search history.

(56) References Cited

U.S. PATENT DOCUMENTS

| | | | |
|---|---|---|---|
| 9,639,884 | B2 | 5/2017 | Chow et al. |
| 9,922,327 | B2 | 3/2018 | Johnson et al. |
| 10,497,046 | B2 | 12/2019 | Dabral et al. |
| 10,789,639 | B2* | 9/2020 | Edwards ................ G06Q 20/34 |
| 2002/0143663 | A1 | 10/2002 | Walsh et al. |
| 2003/0014319 | A1 | 1/2003 | Arbab et al. |
| 2003/0046172 | A1 | 3/2003 | Himmel et al. |
| 2011/0093361 | A1 | 4/2011 | Morales |
| 2012/0310914 | A1 | 12/2012 | Khan |
| 2013/0085888 | A1 | 4/2013 | Kim et al. |
| 2014/0279214 | A1 | 9/2014 | Wagoner-Edwards et al. |
| 2015/0026005 | A1 | 1/2015 | Shamia et al. |
| 2016/0019628 | A1* | 1/2016 | Udumudi ........... G06Q 30/0633 705/26.1 |
| 2017/0220986 | A1* | 8/2017 | Putcha ................. G06Q 20/102 |
| 2019/0281030 | A1* | 9/2019 | Isaacson ............. H04L 63/0838 |
| 2021/0217001 | A1* | 7/2021 | Harrison ............. G06F 21/6218 |
| 2021/0243177 | A1* | 8/2021 | Burson ................. H04W 12/06 |

* cited by examiner

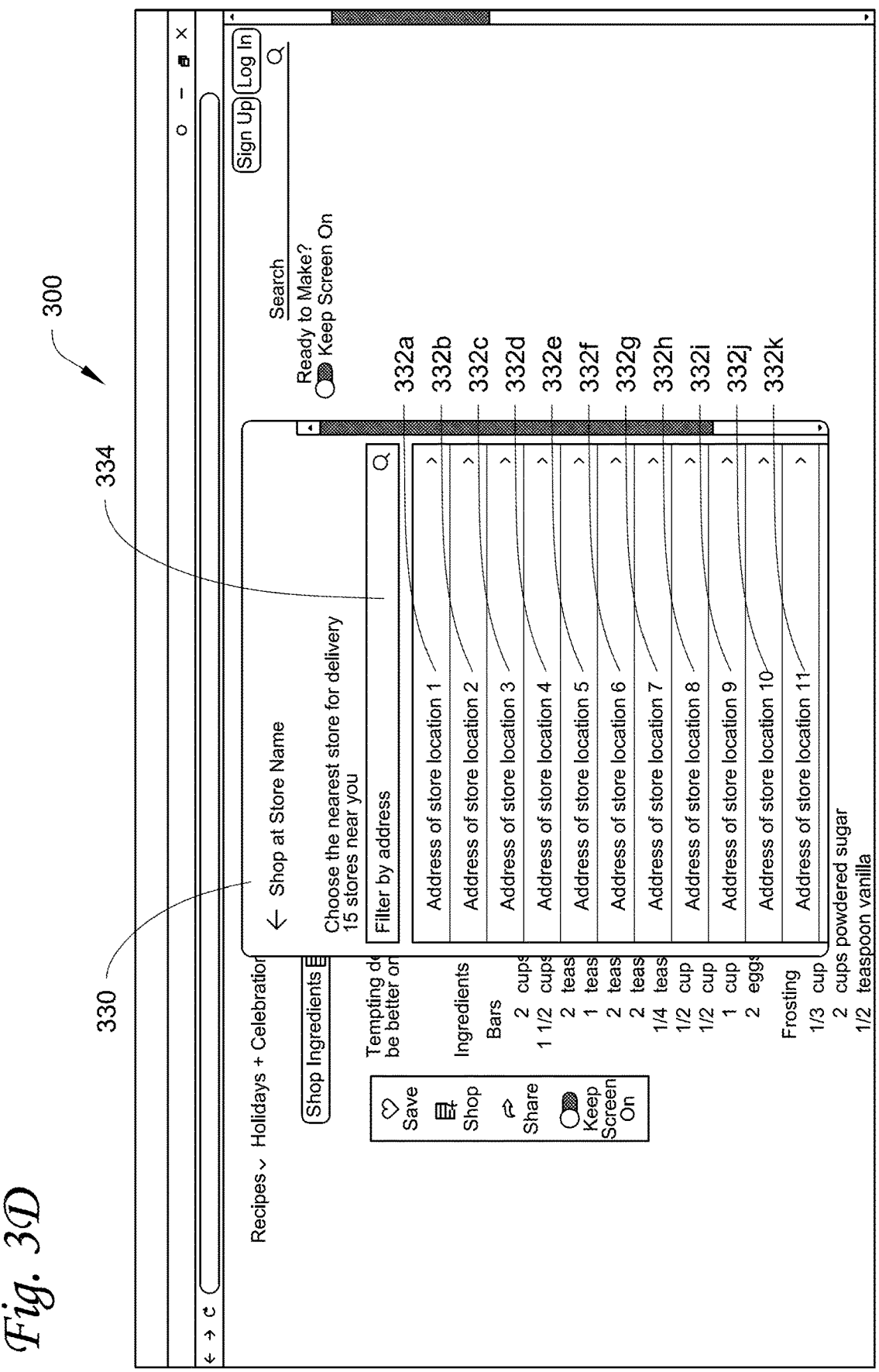

METHOD AND SYSTEM FOR SECURE ELECTRONIC SHOPPING CART TRANSFER AND MERGE

FIELD

This disclosure relates generally to secure electronic shopping cart transfer and merge from a third party online service. More specifically, this disclosure relates to secure electronic shopping cart transfer and merge created by an affiliate online service for purchase on a retailer online service.

BACKGROUND

Retail shopping continues to evolve as consumers look for new ways of shopping for products via various online services (e.g., websites, apps, etc.). This can include third party companies partnering with a retailer to facilitate online shopping for item(s) in a secure and efficient manner.

SUMMARY

This disclosure relates generally to secure electronic shopping cart transfer and merge from a third party online service. More specifically, this disclosure relates to secure electronic shopping cart transfer and merge created by an affiliate online service for purchase on a retailer online service.

The embodiments disclosed herein can allow a retailer online service to merge product(s) from an electronic shopping cart generated and curated by an affiliate online service with product(s) already included in a user's pre-existing electronic shopping cart with the retailer online service without requiring the retailer online service to share cookies (e.g., hypertext transfer protocol (HTTP) cookies) of a user device being used by the user with the affiliate online service. In some embodiments, the retailer online service can merge an anonymous electronic shopping cart curated by the affiliate online service with a user's pre-existing electronic shopping cart with the retailer online service before requiring user authentication with the retailer online service.

The embodiments disclosed herein can transfer item(s) in an electronic shopping cart generated and curated by an affiliate online service to the retailer online service in a secure manner under restrictions established by the retailer. In some embodiments, the retailer online service can require a guest security platform (GSP) token prior to allowing the affiliate online service to curate an electronic shopping cart (e.g., an anonymous electronic shopping cart, a guest account electronic shopping cart, etc.) on the retailer online service and transfer the electronic shopping cart to the retailer online service.

The embodiments disclosed herein can assist affiliates/external partners to access and use purchase capabilities provided by a retailer online service. The embodiments described herein can also be affiliate agnostic as any affiliate online service can generate and curate an electronic shopping cart that can be securely transferred to the retailer online service.

The embodiments disclosed herein can allow an affiliate online service to curate an electronic shopping cart for the retailer online service that is anonymous (e.g., does not include any identifying information that links the user to a guest account of the retailer online service). The anonymous electronic shopping cart can then be transferred to the retailer online service whereby the retailer online service can identify the user (e.g., based on cookies associated with the retailer online service stored in a user device) and be merged with the user's pre-existing electronic shopping cart. In some embodiments, the retailer online service can include a cookie identifier to access cookies in the user device associated with the retailer online service to identify the user. Once the user is identified, a cart merge API of the retailer online service can merge the anonymous electronic shopping cart with a user's pre-existing electronic shopping cart to create a combined electronic shopping cart for the user. The retailer online service can then display the combined electronic shopping cart to the user via a retailer graphical user interface (GUI) so as to allow the user to purchase one or more products in the combined electronic shopping cart. By identifying the user based on cookies stored in the user device, the cart merge API can merge the anonymous electronic shopping cart with the user's pre-existing electronic shopping cart before requiring authentication of the user with the retail online service.

In some embodiments, an authentication token can be provided to the affiliate online service that can allow the affiliate online service to access and curate an electronic shopping cart for the retailer online service using a cart item application programming interface (API) of the retailer online service. In some embodiments, the authentication token can be an anonymous token that does not include any identifying information linking the user for which the affiliate online service is curating the electronic shopping cart to a guest account of the retailer online service. In some embodiments, the authentication token can be a guest account token that includes identifying information that links the user to a guest account of the retailer online service for which the affiliate online service is curating the electronic shopping cart. In some embodiments, the authentication token can be requested by the affiliate online service and generated by the retailer online service. The retailer online service validates the authentication token in order to allow the affiliate online service to create an electronic shopping cart using the cart item API. The authentication token can also allow the affiliate online service to transfer the user via a user device to the retailer online service. In some embodiments, the authentication token can restrict the affiliate online service to certain functionality of the cart item API. In some embodiments, the functionality of the cart item API restricted to the affiliate online service can vary based on whether the affiliate online service is requesting an anonymous token or a guest account token. For example, less functionality of the cart item API may be restricted for a guest account token than for an anonymous token. In some embodiments, the amount of functionality of the cart item API restricted by an anonymous token or a guest account token can vary based on the relationship between the affiliate online service and the retailer online service. By requiring an authentication token in order for the affiliate online service to access and use the cart item API of the retailer online service, the retailer online service can prevent unauthorized bot (non-human) access/traffic of the cart item API.

Methods and systems for securely transferring and merging an electronic shopping cart curated by an affiliate online service for purchase on a retailer online service is disclosed. The retailer online service can provide an anonymous token to the affiliate online service that allows the affiliate online service to curate an anonymous electronic shopping cart for a user that does not include any identifying information that links the user to a guest account of the retailer online service. When the user is redirected from the affiliate online service to the retailer online service, the retailer online service can validate the anonymous token. Upon validation of the anonymous token, the retailer online service can obtain identifying information that links the user to a guest account of the retailer online service and obtain a pre-existing electronic shopping cart linked to the guest account. The retailer online service can then merge the anonymous electronic shopping cart with the pre-existing electronic shopping cart.

In one embodiment, a method for securely transferring and merging an electronic shopping cart curated by an affiliate online service for purchase on a retailer online service is provided. The method includes a GSP API of the retailer online service receiving a request for an anonymous token from the affiliate online service that does not include information regarding a user, the GSP API generating the anonymous token, and the GSP API sending the anonymous token to the affiliate online service. The method also includes a cart item API of the retailer online service receiving one or more products to add to an anonymous electronic shopping cart from the affiliate online service, and the cart item API adding the one or more products to the anonymous electronic shopping cart. Also, the method includes a user device being redirected from the affiliate online service to the retailer online service with the anonymous token. Further, the method includes the GSP API validating the anonymous token prior to the user, via the user device, accessing an electronic shopping cart display of a retailer GUI. Moreover, the method includes the retailer GUI accessing a cookie stored in the user device upon the GSP API validating the anonymous token, the retailer GUI obtaining identifying information that links the user to a guest account of the retailer online service based on the cookie and determining whether the user, via the guest account, has a pre-existing electronic shopping cart linked to the guest account. Upon determining that the user has the pre-existing electronic shopping cart linked to the guest account, a cart-merge API creating a combined electronic shopping cart by transferring and merging one or more products of the pre-existing electronic shopping cart linked to the guest account with the one or more products of the anonymous electronic shopping cart. Upon the cart-merge API creating the combined electronic shopping cart, the retailer GUI initiating a shopping cart API to retrieve and display the combined electronic shopping cart on the user device.

In another embodiment, a system for securely transferring and merging an electronic shopping cart curated by an affiliate online service for purchase on a retailer online service is provided. The system includes a retailer online service that includes a GSP API, a cart item API, a cart-merge API, a shopping cart API, and a retailer GUI. The GSP API is configured to receive a request for an anonymous token from the affiliate online service that does not include information regarding a user, generate the anonymous token, and send the anonymous token to the affiliate online service. The cart item API is configured to: receive one or more products to add to an anonymous electronic shopping cart from the affiliate online service, and add the one or more products to the anonymous electronic shopping cart. The cart-merge API is configured to transfer and merge the one or more products added to the anonymous shopping circuit with a pre-existing electronic shopping cart linked to a guest account. The shopping cart API is configured to retrieve and display an electronic shopping cart on a user device. The retailer GUI is configured to allow the user, via the user device, to shop for and purchase one or more products from the retailer online service. Upon the user device being redirected from the affiliate online service to the retailer online service with the anonymous token, the GSP API is configured to validate the anonymous token prior to the user, via the user device, accessing an electronic shopping cart display of the retailer GUI. Also, the retailer GUI is configured to: access a cookie stored in the user device upon the GSP API validating the anonymous token; obtain identifying information that links the user to a guest account of the retailer online service based on the cookie; determine whether the user, via the guest account, has the pre-existing electronic shopping cart linked to the guest account. Upon determining that the user has the pre-existing shopping cart linked to the guest account, the cart-merge API is configured to create a combined electronic shopping cart by transferring and merging one or more products of the pre-existing electronic shopping cart linked to the guest account with the one or more products of the anonymous electronic shopping cart. Upon the cart-merge API creating the combined electronic shopping cart, the retailer GUI is configured to initiate the shopping cart API to retrieve and display the combined electronic shopping cart on the user device.

BRIEF DESCRIPTION OF THE DRAWINGS

References are made to the accompanying drawings that form a part of this disclosure and which illustrate embodiments in which the systems and methods described in this specification can be practiced.

FIGS. 3A-F illustrate screenshots of an affiliate GUI, according to one embodiment.

Like reference numbers represent like parts throughout.

DETAILED DESCRIPTION

This disclosure relates generally to secure electronic shopping cart transfer and merge from a third party online service (e.g., a third party website, a third party app, etc.). More specifically, this disclosure relates to secure electronic shopping cart transfer and merge created by an affiliate online service for purchase on a retailer online service (e.g., a retailer website, a retailer app, etc.).

As defined herein, cookies refer to blocks of data created by a server while a user is accessing an online service (e.g., website, app, etc.). HTTP cookies refer to blocks of data created by a web server while a user is browsing a website. Generally, cookies (including HTTP cookies) are stored in the user's device, for example, by the user's web browser. It will be appreciated that the web server can create different cookies for different online services. Also, cookies created for one online service may or may not be shareable with another online service.

An item, as defined herein, refers to a general consumer good or service that can be sold by a retailer. Categories of consumer goods can include, for example, food, clothing, vehicles, electronics, appliances, etc. Categories of consumer services can include, for example, haircuts, oil changes, home appliance and electronics installations, etc. Non-limiting examples of an item can include, for example, sugar, milk, baby wipes, bandages, all-purpose cleaner, etc.

A product, as defined herein, refers to a specific version of the item that is available for purchase from a retailer. A product is typically branded. Non-limiting examples of a product can include, for example, Good & Gather™ Granulated Sugar—4 lbs, Good & Gather™ Vitamin D Whole Milk, up & up™ Fragrance-Free Baby Wipes, up & up™ Variety Pack Bandages—30 ct, up & up™ All-Purpose Cleaner with Bleach—32 oz, etc.

Figure 1:
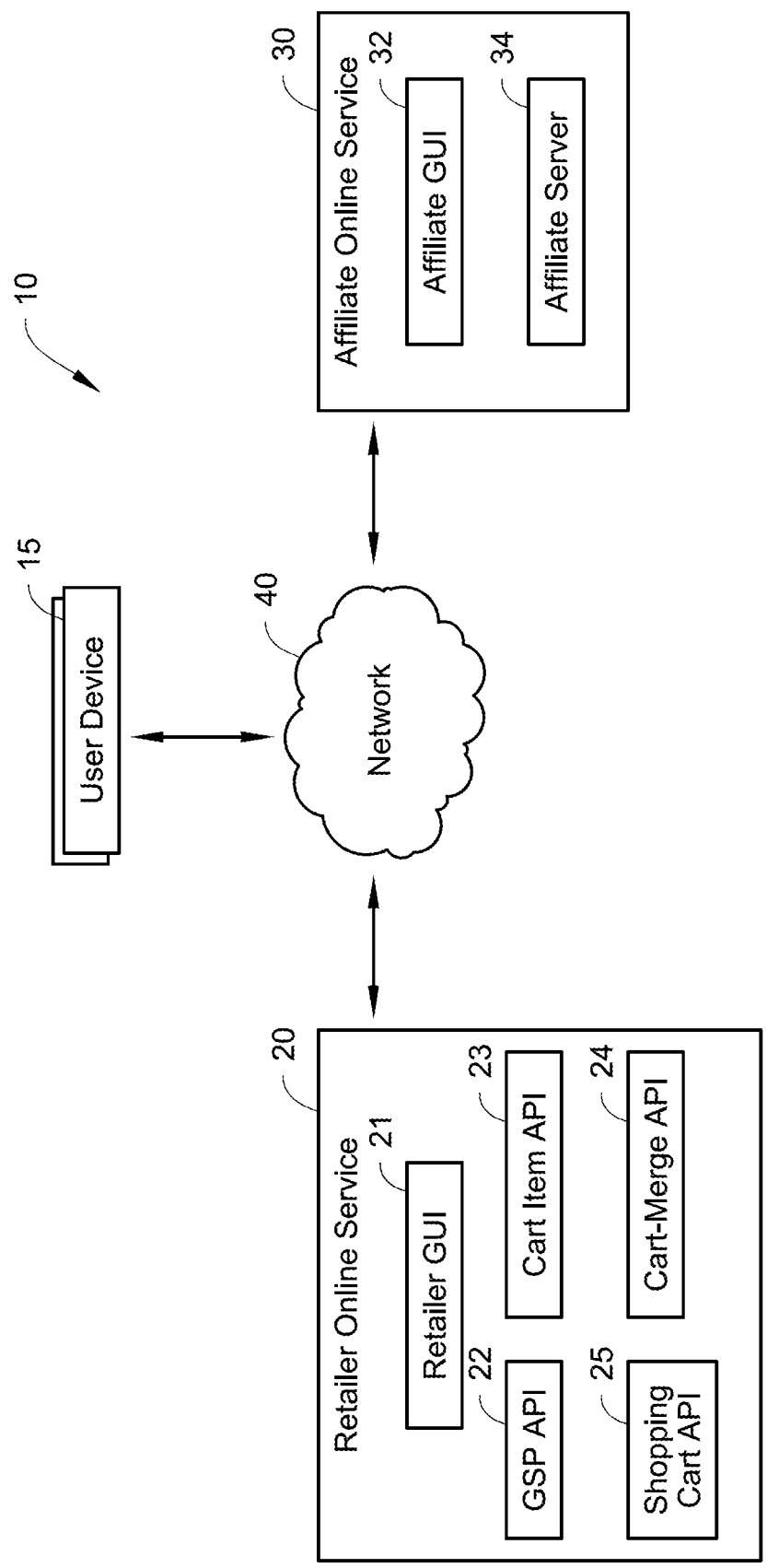
FIG. 1 is a schematic diagram of a system for implementing secure electronic shopping cart transfer using an anonymous token, according to one embodiment.

FIG. 1 is a schematic diagram of a system 10 for implementing an electronic shopping cart transfer, according to one embodiment. The system 10 can allow a retailer to merge item(s) from a cart generated and curated by an affiliate online service with item(s) already included in a user's electronic shopping cart without requiring the retailer online service to share cookies (e.g., HTTP cookies) of the user with the affiliate online service. In particular, the system 10 can be used to transfer item(s) in an electronic shopping cart generated and curated by the affiliate online service to the retailer online service in a secure manner under restrictions established by the retailer. The components of the system 10 can perform the method 200 described in detail below and shown in FIG. 2.

The system 10 includes a retailer online service 20 and an affiliate online service 30 that can make an online service (e.g., a website, an app, etc.) available to one or more user devices 15 via a network 40.

The one or more user devices 15 are configured to access the retailer online service 20 and/or the retailer online service via the network 40. The one or more user devices 15 are the same as or similar to aspects of the computer device 500 as shown and described in accordance with FIG. 5 below. The user device(s) 15 can include, but are not limited to, a desktop computer, a cellular/mobile phone, a tablet device, and a laptop computer.

The retailer online service 20 is configured to provide an online shopping experience for a user using the user device(s) 15. The retailer online service 20 includes a retailer GUI 21, a guest security platform (GSP) application programming interface (API) 22, a cart item API 23, a cart-merge API 24, and an electronic shopping cart API 25.

The retailer GUI 21 is configured to allow user(s), via the one or more user devices 15, to shop for and purchase products from a retailer. The retailer GUI 21 can be accessed by the user device(s) 15 via a website, an app, etc. The retailer GUI 21 can display an electronic shopping cart screen that allows a user to view and complete the purchase of one or more products from the retailer. An example of an electronic shopping cart screen according to one embodiment is shown and described in detail below with respect to FIG. 4. In some embodiments, the retailer GUI 21 is also configured to determine whether the user has a pre-existing retailer online service session. In some embodiments, the retailer GUI 21 can include a cookie identifier. The cookie identifier can look for and access one or more cookies (e.g., HTTP cookies) associated with the retailer online service 20 (e.g., one or more cookies for the retailer GUI 21) that are stored in the user device 15 to identify and link the user to a guest account and determine, based on the identified guest account, whether the identified guest account has a pre-existing retailer online service session that includes, for example, a pre-existing electronic shopping cart linked to the guest account.

The GSP API 22 is configured to generate an authentication token that allows the affiliate online service 30 to be able to access the cart item API 23. In some embodiments, an affiliate server 34 of the affiliate online service 30 can request the GSP API 22 to create the authentication token. The GSP API 22 is also configured to validate an authentication token provided by, for example, the affiliate online service 30 when attempting to access the cart item API 23. The authentication token can be cryptographically signed to prevent forgery and can include a unique identifier that can associate a user session with activity on the retailer GUI 21 including an electronic shopping cart. The GSP API 22 can generate different types of authentication tokens (e.g., anonymous tokens, guest account tokens, etc.) with different permission levels that can allow or restrict different functionality on the retailer online service 20.

In some embodiments, the GSP API 22 can communicate with a GSP service that is separate from the GSP API to generate and/or validate an authentication token. In some embodiments, the GSP service can be part of the retailer online service 20.

In some embodiments, the authentication token can be an anonymous token that includes information regarding the affiliate online service 30 (e.g., an affiliate client identification and/or password) but does not include identifying information that links the user to a guest account of the retailer online service. The identifying information for an anonymous account can include, for example, a user's anonymous identifier and an affiliate client identifier.

In some embodiments, the authentication token can be a guest account token that includes information regarding the affiliate online service 30 (e.g., an affiliate client identification and/or password) and identifying information regarding the user (e.g., a guest account identification and/or password). The identifying information for a guest account can include, for example, a user's email address, a user's profile identifier, and an affiliate client identifier. A guest account token can also include a permission level that is different from the permission level for an anonymous token.

The authentication token includes a permission level that can provide authorization for the affiliate online service 30 to perform certain operations on the cart item API 23 and can restrict the affiliate online service 30 from being able to access other operations on the cart item API 23. For example, an anonymous account token can include a permission level that allows the affiliate online service 30 to instruct the cart item API 23 to add one or more products to a retailer electronic shopping cart via the cart item API 23, add one or more fulfillment options via the cart item API 23, add one or more promotion codes to the retailer electronic shopping cart, add anonymous guest location information to the retailer electronic shopping cart, etc. In some embodiments, the permission level of the anonymous token may not have sufficient authorization for the affiliate online service 30 to instruct the cart item API 23 from adding, for example, payment information, a shipping address, etc. to the retailer electronic shopping cart on behalf of the user. In some embodiments, a guest account token can include a different permission level that allows the affiliate online service 30 to perform certain operations on the cart item API 23 that an anonymous token is not authorized to perform. This can include, for example, the affiliate online service 30 being able to add, for example, payment information, a shipping address, etc. to the retailer electronic shopping cart on behalf of the user. Similar to the permission level for an anonymous token, the permission level for the guest account token can also allow the affiliate online service 30 to instruct the cart item API 23 to add one or more products to a retailer electronic shopping cart via the cart item API 23, add one or more fulfillment options via the cart item API 23, add one or more promotion codes to the retailer electronic shopping cart, add anonymous guest location information to the retailer electronic shopping cart, etc.

The cart item API 23 is configured to allow the affiliate online service 30 (e.g., the affiliate server 34) to add one or more products to a retailer electronic shopping cart on the retailer online service 20. The cart item API 23, based on the authorizations associated with the privilege level provided in the authentication token, can control which operations can be performed by the affiliate online service 30 (e.g., adding one or more products to a retailer electronic shopping cart, adding one or more fulfillment options, adding one or more promotion codes to the electronic shopping cart, adding anonymous guest location information to the electronic shopping cart, adding payment information, adding shipping address information, etc.). In some embodiments, the cart item API 23 can allow the affiliate online service 30 to generate an anonymous electronic shopping cart that does not include any identifying information that links the user to a guest account of the retailer online service. In some embodiments, the cart item API 23 can also allow the affiliate online service 30 to generate a guest account electronic shopping cart that does include identifying information that links the user to a guest account of the retailer online service. In some embodiments, the cart item API 23 can prevent the affiliate online service 30 from adding, for example, certain products (e.g., age restricted products) that may require user age validation (e.g., tobacco products, alcohol products, console games, etc.) unless the affiliate online service 30 provides age related information of the user.

The cart-merge API 24 is configured to transfer and merge one or more products added to an anonymous electronic shopping cart with any products added to an electronic shopping cart during a pre-existing retailer online service session to create a combined electronic shopping cart for the user. The cart-merge API 24 can create the combined electronic shopping cart prior to the electronic shopping cart display of the retailer GUI 21 being viewable on the user device(s) 15.

The electronic shopping cart API 25 is configured to display an electronic shopping cart of the retailer online service 20 onto the retailer GUI 21. In some embodiments, the electronic shopping cart API 25 can display an anonymous shopping cart, a merged shopping cart, and a guest account shopping cart onto the retailer GUI 21.

The affiliate online service 30 is configured to provide an online experience for a user using the user device(s) 15. The online experience can vary depending on the purpose of the affiliate. For example, in some embodiments the affiliate online service 30 can provide a cooking recipe database for users to find a cooking recipe, a crafting tutorial database for users to learn how to make different crafting projects, etc. The affiliate online service 30 can be an affiliate/partner of the retailer online service 20. The affiliate online service 30 can curate an electronic shopping cart with one or more products that can be purchased using the retailer online service 20. In some embodiments, the affiliate online service 30 can use the cart item API 23 to add products (e.g., age restricted products) that may require user age validation (e.g., tobacco products, alcohol products, console games, etc.) when the affiliate online service 30 provides age related information of the user. The affiliate online service 30 includes an affiliate GUI 32 and an affiliate server 34.

The affiliate GUI 32 is configured to allow user(s), via the one or more user devices 15, to interact with the affiliate's online services. The affiliate GUI 32 can be accessed by the user device(s) 15 via a website, an app, etc. The affiliate GUI 32 can communicate with the affiliate server 34 via the network 40. The affiliate GUI 32 can communicate with the GSP API 22, the cart item API 23, and the user device(s) 15 via the network 40. In some embodiments, the affiliate GUI 32 can also optionally communicate with the retailer GUI 21, the cart-merge API 24, and the electronic shopping cart API 25. In some embodiments, the affiliate GUI 32 can communicate with the cart item API 23 to add one or more products to an electronic shopping cart of the retailer online service 20. In particular, the affiliate GUI 32 can allow a user to view and edit a curated electronic shopping cart created by the affiliate online service 30. Examples of screens of the affiliate GUI 32 according to one embodiment are shown and described in detail below with respect to FIGS. 3A-F. The affiliate GUI 32 can be provided on the user device(s) 15 by the affiliate server 34.

The affiliate server 34 is configured to interact with and coordinate operation of the affiliate GUI 32. The affiliate server 34 can communicate with the affiliate GUI 32 via the network 40. The affiliate server 34 can communicate with the GSP API 22, the cart item API 23, and the user device(s) 15 via the network 40. In some embodiments, the affiliate server 34 can also optionally communicate with the retailer GUI 21, the cart-merge API 24, and the electronic shopping cart API 25. In some embodiments, the affiliate server 34 can communicate with the GSP API 22 to request an authentication token for use with the retailer online service 20 (including accessing the cart item API 23). In some embodiments, the affiliate server 34 can also communicate with the cart item API 23 to add one or more products to an electronic shopping cart of the retailer online service 20. In some embodiments, the affiliate server 34 can also redirect the affiliate GUI 32 to the retailer GUI 21. It will be appreciated that the affiliate server 34 can be implemented on a distributed network of servers located at one or more locations. In an embodiment, aspects of the affiliate server 34 can be the same as or similar to aspects of the server device 535 shown and described in accordance with FIG. 5 below.

In an embodiment, the network 40 is representative of the Internet. In an embodiment, the network 40 can include one or more local area networks (LANs), one or more wide area networks (WANs), one or more wireless networks, one or more cellular data networks, suitable combinations thereof, or the like. In an embodiment, aspects of the network 40 can be the same as or similar to aspects of the network 540 as shown and described in accordance with FIG. 5 below.

Figure 2:
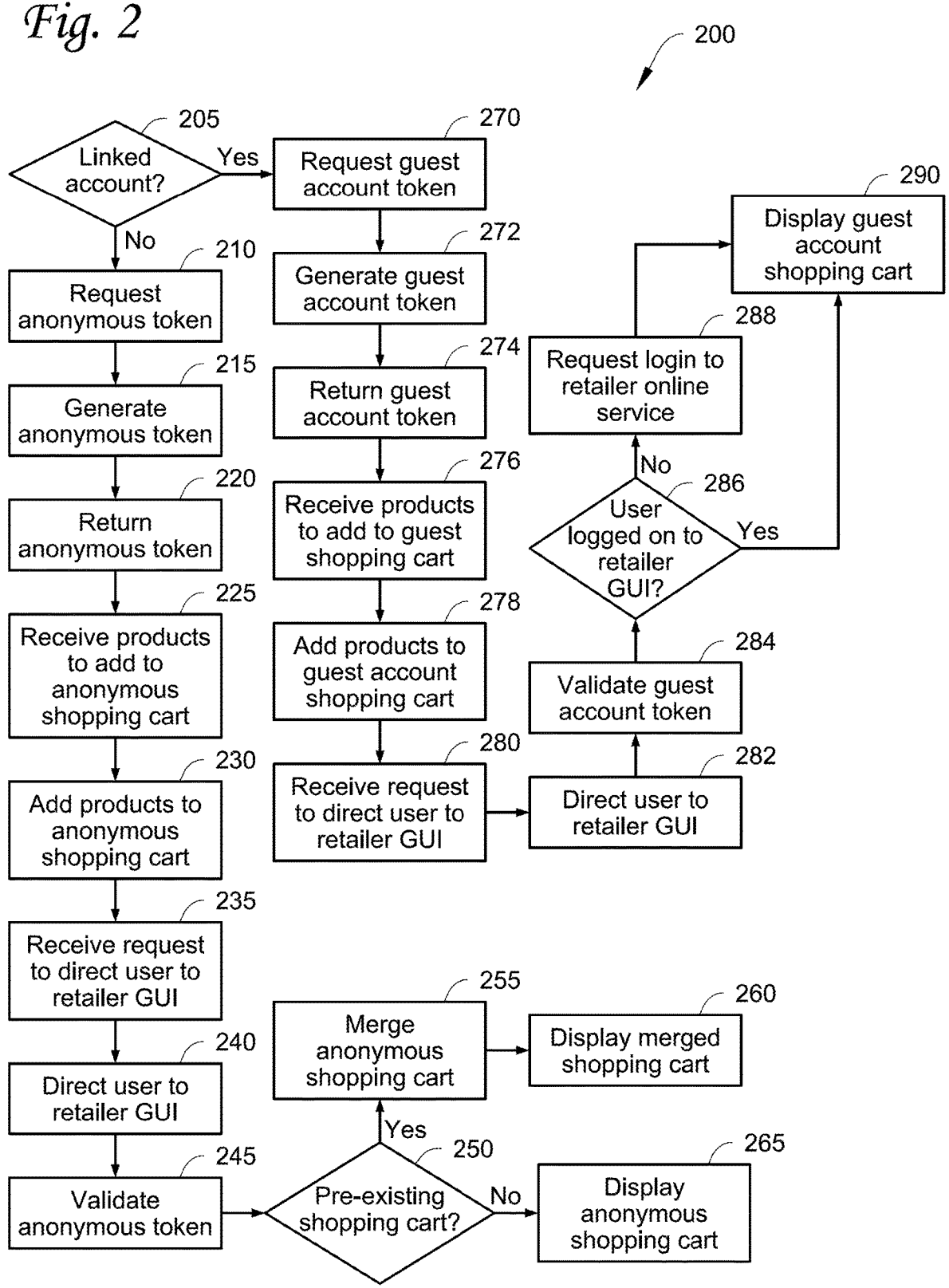
FIG. 2 is a flowchart of a method for securely transferring and/or merging an electronic shopping cart created by an affiliate online service for purchase on a retailer online service, according to an embodiment.

FIG. 2 illustrates a method 200 of transferring and/or merging an electronic shopping cart created and curated by the affiliate online service 30 for purchase on the retailer online service 20.

The method 200 begins at 205, whereby the affiliate server 34 determines whether the user has linked a guest account of the retailer online service 20 with the affiliate online service 30. When the affiliate server 34 determines that the user has not linked an account from the affiliate online service 30 to the retailer online service 20, the method proceeds to 210. When the affiliate server 34 determines that the user has linked an account from the affiliate online service 30 to the retailer online service 20, the method proceeds to 270.

At 210, the GSP API 22 receives a request from the affiliate online service 30 for an anonymous token to be used for creating an anonymous electronic shopping cart for the retailer online service 20. The anonymous account token can be used by the affiliate server 34 to access the cart item API 23. The anonymous token can include information regarding the affiliate online service 30 but does not include any identifying information that links the user to a guest account of the retailer online service 20. In some embodiments, the anonymous token can include a permission level that indicates what functionality of the cart item API 23 is permitted to the affiliate online service 30 (e.g., adding product(s) to an anonymous electronic shopping cart) and what functionality is restricted to the affiliate online service 30 (e.g., adding payment information, shipping address, etc. on behalf of the user). The method 210 then proceeds to 215.

At 215, the GSP API 22 generates (via request from the affiliate online service 30) an anonymous token. In some embodiments, this can include the GSP API 22 communicating with a GSP that is separate from the GSP API 22 or even the retailer online service 20 to request the anonymous token be generated and sent back to the affiliate online service 30 via the GSP API 22. The method 200 then proceeds to 220.

At 220, the GSP API 22 sends the generated anonymous token to the affiliate online service 30. The method 200 then proceeds to 225.

At 225, the cart item API 23 receives one or more products to add to an anonymous electronic shopping cart from one of the affiliate GUI 32 or the affiliate server 34. In some embodiments, the user can use the user device 15 to access the affiliate GUI 32 to determine which products to add to the anonymous electronic shopping cart. Once the one or more products are selected by the user via the affiliate GUI 32, one of the affiliate GUI 32 or the affiliate server 34 can send the one or more products to the cart item API 23. The method 200 then proceeds to 230.

At 230, the cart item API 23 adds the one or more products to the anonymous electronic shopping cart and informs the affiliate online service 30 that the one or more products have been successfully added to the anonymous electronic shopping cart. This can include, for example, adding one or more products, cart product channel attributions based on the particular affiliate online service 30, fulfillment options, subscription attributes, etc. Also, the cart item API 23 can add a user location, and any promotion codes from the affiliate online service 30 to the anonymous electronic shopping cart. Further, the cart item API 23 can add a scheduled delivery window and a scheduled delivery location for the one or more products in the anonymous electronic shopping cart.

In some embodiments, the cart item API 23 can automatically adjust any of the one or more products received from the affiliate server 34. Also, cart item API 23 can check to see that the required quantity and/or weight of each of the one or more products is available. For example, any of the products that are out of stock, has a restriction (e.g., an age restriction), or is not available in the desired quantity can be included in a "save for later" portion of the electronic shopping cart once the user is linked to a guest account of the retailer online service 20. In some embodiments, the cart item API 23 can access a catalog search API (not shown) of the retailer online service 20 that can automatically find alternatives or substitutes for any of the products that are out of stock, has a restriction (e.g., an age restriction), or is not available in the desired quantity and replace the out of stock or restricted product with an alternative or substitute product. The method 200 then proceeds to 235.

At 235, the affiliate GUI 32 receives a request from the user to redirect the user from the affiliate GUI 32 to the electronic shopping cart display of the retailer GUI 21. The method 200 then proceeds to 240.

At 240, the user is redirected from the affiliate GUI 32 to the electronic shopping cart display of the retailer GUI 21 with the anonymous token received by the affiliate online service 30 from the GSP API 22 at 220. In some embodiments, this can include the user being redirected from an affiliate webpage to a retailer webpage. In some embodiments, this can include the user device 15 being redirected from an affiliate app to a retailer app. In some embodiments, the affiliate GUI 32 redirects the user from the affiliate GUI 32 to the electronic shopping cart display of the retailer GUI 21. In some embodiments, the electronic shopping cart display of the retailer GUI 21 is not viewable on the user device 15 at this stage of the method 200. The method 200 then proceeds to 245.

At 245, the retailer GUI 21 initiates the GSP API 22 to validate the anonymous token received from the affiliate online service 30. In some embodiments, the GSP API 22 may not validate the anonymous token when, for example, the anonymous token is expired, the anonymous token was tampered, an incorrect affiliate client identification and/or password is provided, etc. In these embodiments, the method 200 may end and a notification can be sent to the affiliate online service 30. It will be appreciated that the GSP API 22 validates the anonymous token prior to the electronic shopping cart display of the retailer GUI 21 being viewable on the user device 15. The method 200 then proceeds to 250.

At 250, upon validation of the anonymous token, the retailer GUI 21 determines whether the user has a pre-existing retailer online service session. In some embodiments, the retailer GUI 21 can include a cookie identifier. The cookie identifier can look for and access one or more cookies (e.g., HTTP cookies) associated with the retailer online service 20 (e.g., one or more cookies for the retailer GUI 21) that are stored in the user device 15 to identify and link the user to a guest account and determine, based on the identified guest account, whether the identified guest account has a pre-existing retailer online service session that includes, for example, a pre-existing electronic shopping cart linked to the guest account. By validating the anonymous token prior to initiating the cart-merge API 24, the method 200 can provide a secure way of transferring products from an anonymous electronic shopping cart to a pre-existing electronic shopping cart linked to the guest account.

When the retailer GUI 21 determines that the identified guest account has a pre-existing electronic shopping cart with the retailer online service 20, the method 200 proceeds to 255. When the retailer GUI 21 determines that the guest account does not have a pre-existing electronic shopping cart with the retailer online service 20, the method 200 proceeds to 265.

At 255, the retailer GUI 21 initiates the cart-merge API 24 to access the pre-existing electronic shopping cart associated with the identified guest account and then transfer and merge the one or more products added to the anonymous electronic shopping cart with any products added to the pre-existing electronic shopping cart linked to the guest account to create a combined electronic shopping cart for the user. This can include, for example, adding one or more products, cart product channel attribution, fulfillment options, subscription attributes, etc. Also, the cart-merge API 24 can add a user location, and any promotion codes from the affiliate online service 30 to the combined electronic shopping cart. Further, the cart-merge API 24 can transfer a scheduled delivery window and a scheduled delivery location from the anonymous electronic shopping cart to the combined electronic shopping cart. In some embodiments, the cart-merge API 24 can adjust fulfillment options (e.g., delivery location, delivery time window, store pickup location, store pickup time, etc.) based on any user preferences stored in the cookies associated with the retailer online service 20. In some embodiments, the retailer GUI 21 initiates the cart-merge API 24 to create the combined electronic shopping cart prior to the electronic shopping cart display of the retailer GUI 21 being viewable on the user device 15. In some embodiments, once the combined electronic shopping cart is created, the cart-merge API 24 abandons the anonymous electronic shopping cart. The method 255 then proceeds to 260.

At 260, the retailer GUI 21 initiates the shopping cart API 25 to retrieve and display the electronic shopping cart display which shows the combined electronic shopping cart generated at 255 that includes the one or more products added by the affiliate GUI 32 or the affiliate server 34 to the anonymous electronic shopping cart with the one or more products added to the user's electronic shopping cart during a pre-existing retailer online service session. This can include allowing the user to: edit the quantity of any of the one or more products in the combined electronic shopping cart, select a backup product for any of the one or more products in case the particular product is not available, save any of the one or more products for later purchase, select an available shipping/pickup/delivery option for each of the one or more products, remove any of the one or more products from the electronic shopping cart display, select a checkout option to finalize purchase of the one or more products, etc. The electronic shopping cart display can also show a cost for each of the one or more items and an order summary (including, for example, a subtotal cost, any discounts applied, any delivery fee, any estimated tax amount, and a total amount, etc.).

At 265, the retailer GUI 21 initiates the shopping cart API 25 to retrieve and display the electronic shopping cart display which shows the one or more products added by the affiliate server 34 to the anonymous electronic shopping cart onto electronic shopping cart display. At this point the user, via the user device 15 accessing the retailer GUI 21, can purchase the one or more products from the anonymous electronic shopping cart. This can include allowing the user to: edit the quantity of any of the one or more products in the anonymous electronic shopping cart, select a backup product for any of the one or more products in case the particular product is not available, save any of the one or more products for later purchase, select an available shipping/pickup/delivery option for each of the one or more products, remove any of the one or more products from the electronic shopping cart display, select a checkout option to finalize purchase of the one or more products, etc. The electronic shopping cart display can also show a cost for each of the one or more items and an order summary (including, for example, a subtotal cost, any discounts applied, any delivery fee, any estimated tax amount, and a total amount, etc.).

At 270, the GSP API 22 receives a request from the affiliate online service 30 for a guest account token that is linked to user information associated with a guest account of the user. The guest account token can be used by the affiliate server 34 to access the cart item API 23. The guest account token can include information regarding the affiliate online service 30 and identifying information that links the user to a guest account of the retailer online service 20. In some embodiments, the guest account token can include a permission level that indicates what functionality of the cart item API 23 is permitted to the affiliate online service 30 (e.g., adding product(s) to an anonymous electronic shopping cart, adding payment information, shipping address, etc. on behalf of the user) and what functionality is restricted to the affiliate online service 30. The method 200 then proceeds to 272.

At 272, the GSP API 22 generates (via a request from the affiliate online service 30) a guest account token that is linked to the user based on the guest account. The guest account token can be used to add products to a guest account electronic shopping cart for the retailer online service 20. In some embodiments, this can include the GSP API 22 communicating with a GSP to request the guest account token be generated and sent back to the affiliate online service 30 via the GSP API 22. In some embodiments, the guest account token can indicate what functionality of the cart item API 23 is available to the affiliate online service 30 (e.g., adding product(s) to a guest account electronic shopping cart, adding shipping address, adding payment information, etc. on behalf of the user, etc.) and what functionality is restricted to the affiliate online service 30. In some embodiments, the functionality available to the affiliate online service 30 with a guest account token can be different than the functionality available to the affiliate online service 30 with an anonymous token. The method 200 then proceeds to 274.

At 274, the GSP API 22 sends the generated guest account token to the affiliate online service 30. The method 200 then proceeds to 276.

At 276, upon validation of the guest account token the retailer online service 20, the cart item API 23 receives one or more products to add to a guest account electronic shopping cart from one of the affiliate GUI 32 or the affiliate server 34. In some embodiments, the user can use the user device 15 to access the affiliate GUI 32 to determine which products to add to the guest account electronic shopping cart. Once the one or more products are selected by the user via the affiliate GUI 32, the affiliate GUI 32 or the affiliate server 34 can send the one or more products to the cart item API 23. The method 200 then proceeds to 278.

At 278, the cart item API 23 adds the one or more products to the guest account electronic shopping cart and informs the affiliate online service 30 that the one or more products have been successfully added to the guest account electronic shopping cart. In some embodiments, the guest account electronic shopping cart can already include one or more products added by the user during a previous retailer online service session. Thus, the cart item API 23 can add the one or more products obtained at 276 to the guest account electronic shopping cart that includes one or more previously added products. This can include, for example, adding one or more products, cart product channel attributions based on the particular affiliate online service 30, fulfillment options, subscription attributes, etc. Also, the cart item API 23 can add a user location, and any promotion codes from the affiliate online service 30 to the guest account electronic shopping cart. Further, the cart item API 23 can add a scheduled delivery window and a scheduled delivery location for the one or more products in the guest account electronic shopping cart. The method 200 then proceeds to 280.

At 280, the affiliate GUI 32 receives a request from the user to redirect the user from the affiliate GUI 32 to the electronic shopping cart display of the retailer GUI 21. The method 200 then proceeds to 282.

At 282, the user is redirected from the affiliate GUI 32 to the electronic shopping cart display of the retailer GUI 21 with the guest account token received by the affiliate online service 30 from the GSP API 22 at 274. In some embodiments, this can include the user being redirected from an affiliate webpage to a retailer webpage. In some embodiments, this can include the user device 15 being redirected from an affiliate app to a retailer app. In some embodiments, the affiliate GUI 32 redirects the user from the affiliate GUI 32 to the electronic shopping cart display of the retailer GUI 21. In some embodiments, the electronic shopping cart display of the retailer GUI 21 is not viewable on the user device 15 at this stage of the method 200. The method 200 then proceeds to 284.

At 284, the retailer GUI 21 initiates the GSP API 22 to validate the guest account token received from the affiliate online service 30. In some embodiments, the GSP API 22 may not validate the guest account token when, for example, the guest account token is expired, the guest account token was tampered, an incorrect affiliate client or guest account identification and/or password is provided, etc. In these embodiments, the method 200 may end and a notification can be sent to the affiliate online service 30. It will be appreciated that the GSP API 22 validates the guest account token prior to the electronic shopping cart display of the retailer GUI 21 being viewable on the user device 15. The method 200 then proceeds to 286.

At 286, upon validation of the guest account token, the retailer GUI 21 determines whether the user has already logged onto the retailer online service 20. In some embodiments, the retailer GUI 21 determines whether the user has already logged onto the retailer online service 20 prior to the electronic shopping cart display of the retailer GUI 21 being viewable on the user device 15. When the user has not already logged onto the retailer online service 20 the method 200 proceeds to 288. When the user has already logged onto the retailer online service 20 the method 200 proceeds to 290.

At 288, the retailer GUI 21 requests the user to log onto the retailer online service 20 to be able to view the one or more items added to the user's electronic shopping cart on the electronic shopping cart display of the retailer GUI 21. When the user has logged onto the retailer online service 20, the method 200 proceeds to 290.

At 290, the retailer GUI 21 initiates the shopping cart API 25 to retrieve and display the electronic shopping cart display which shows the guest account electronic shopping cart updated at 278 that includes the one or more products added by the affiliate GUI 32 or the affiliate server 34 and potentially any additional product(s) added to the guest account electronic shopping cart during a previous retailer online service session. This can include allowing the user to: edit the quantity of any of the one or more products in the guest account electronic shopping cart, select a backup product for any of the one or more products in case the particular product is not available, save any of the one or more products for later purchase, select an available shipping/pickup/delivery option for each of the one or more products, remove any of the one or more products from the electronic shopping cart display, select a checkout option to finalize purchase of the one or more products, etc. The electronic shopping cart display can also show a cost for each of the one or more items and an order summary (including, for example, a subtotal cost, any discounts applied, any delivery fee, any estimated tax amount, and a total amount, etc.).

Figure 3A:
Figure 3B:
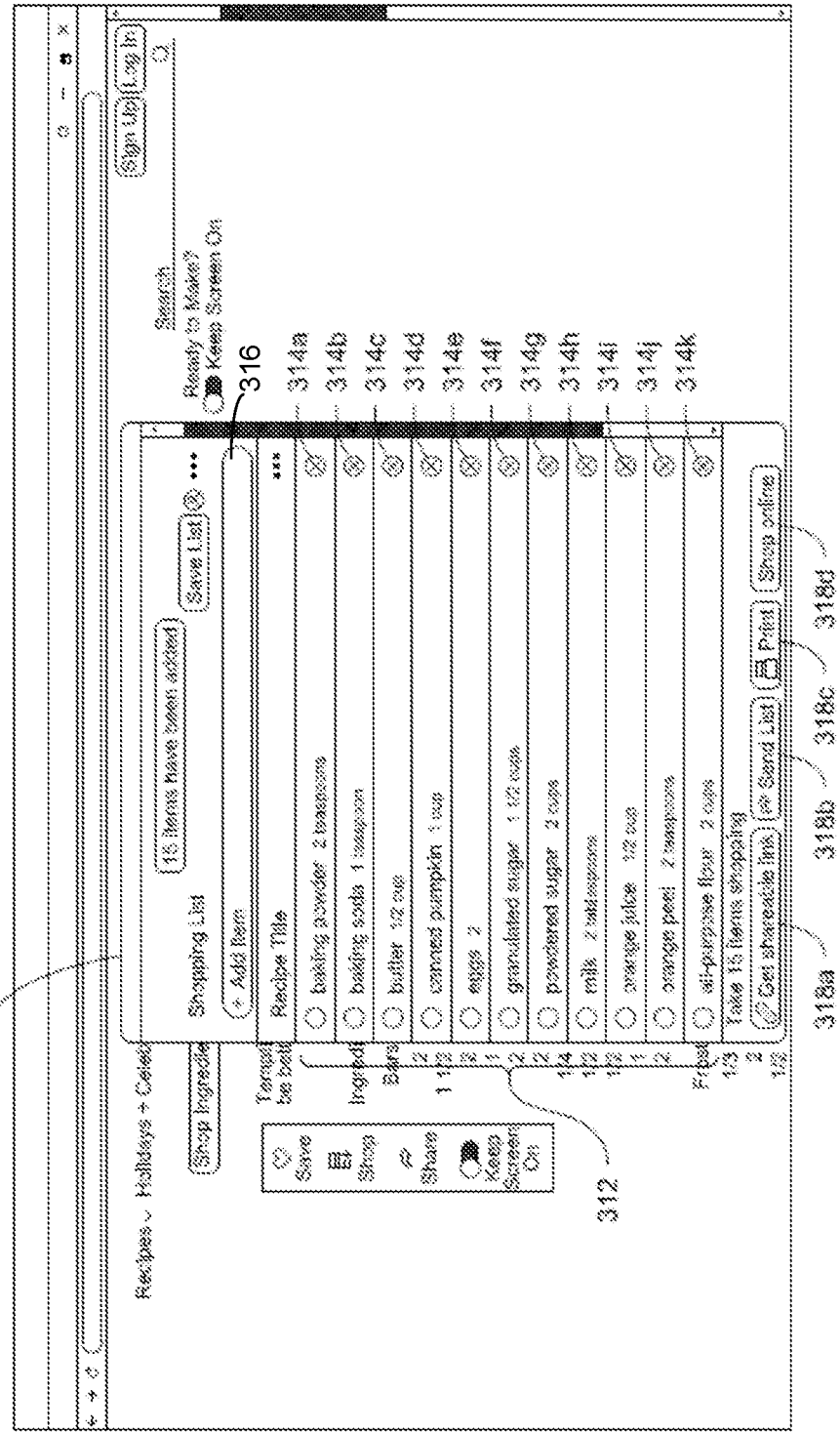
Figure 3C:
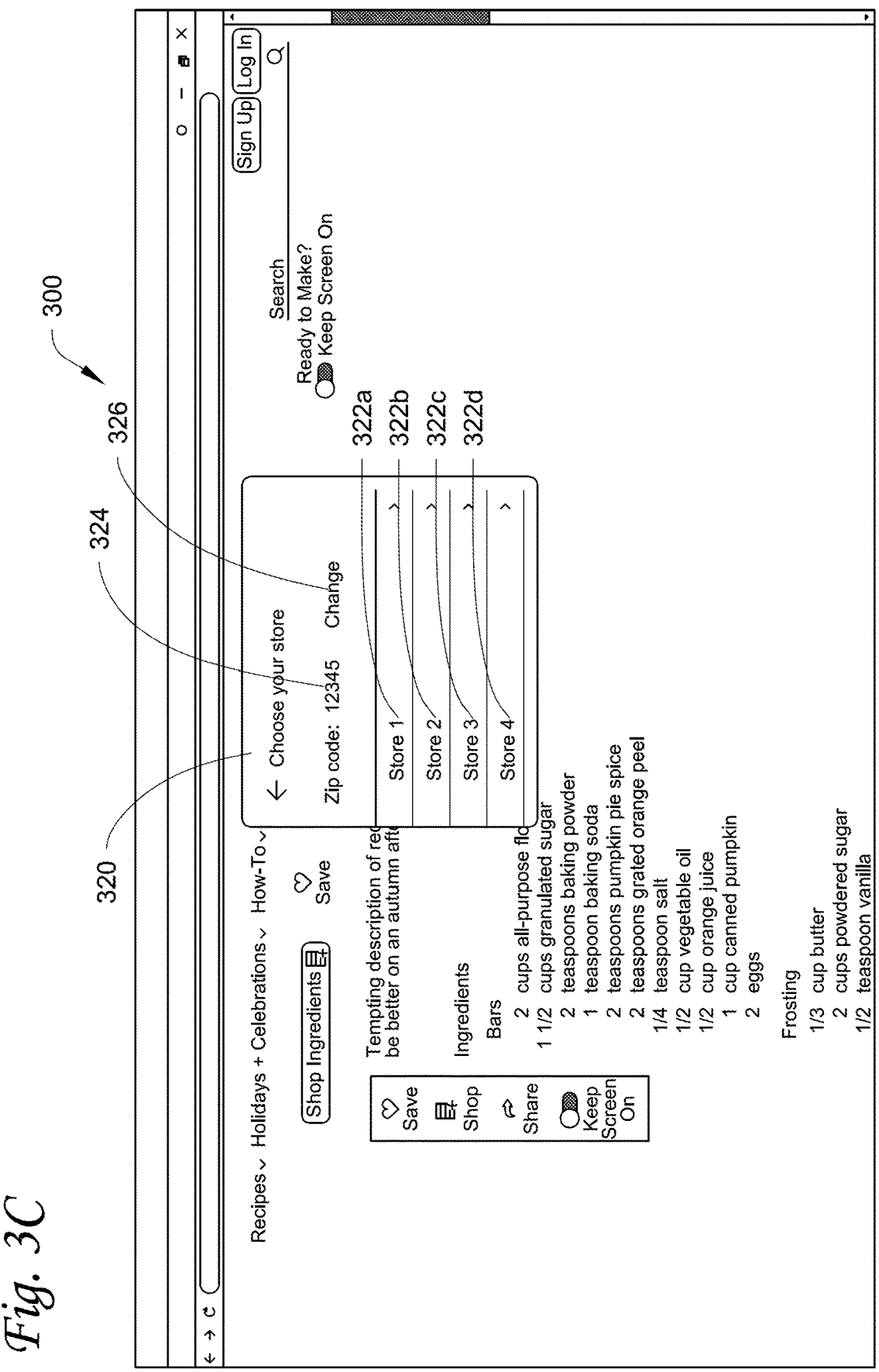
Figure 3E:
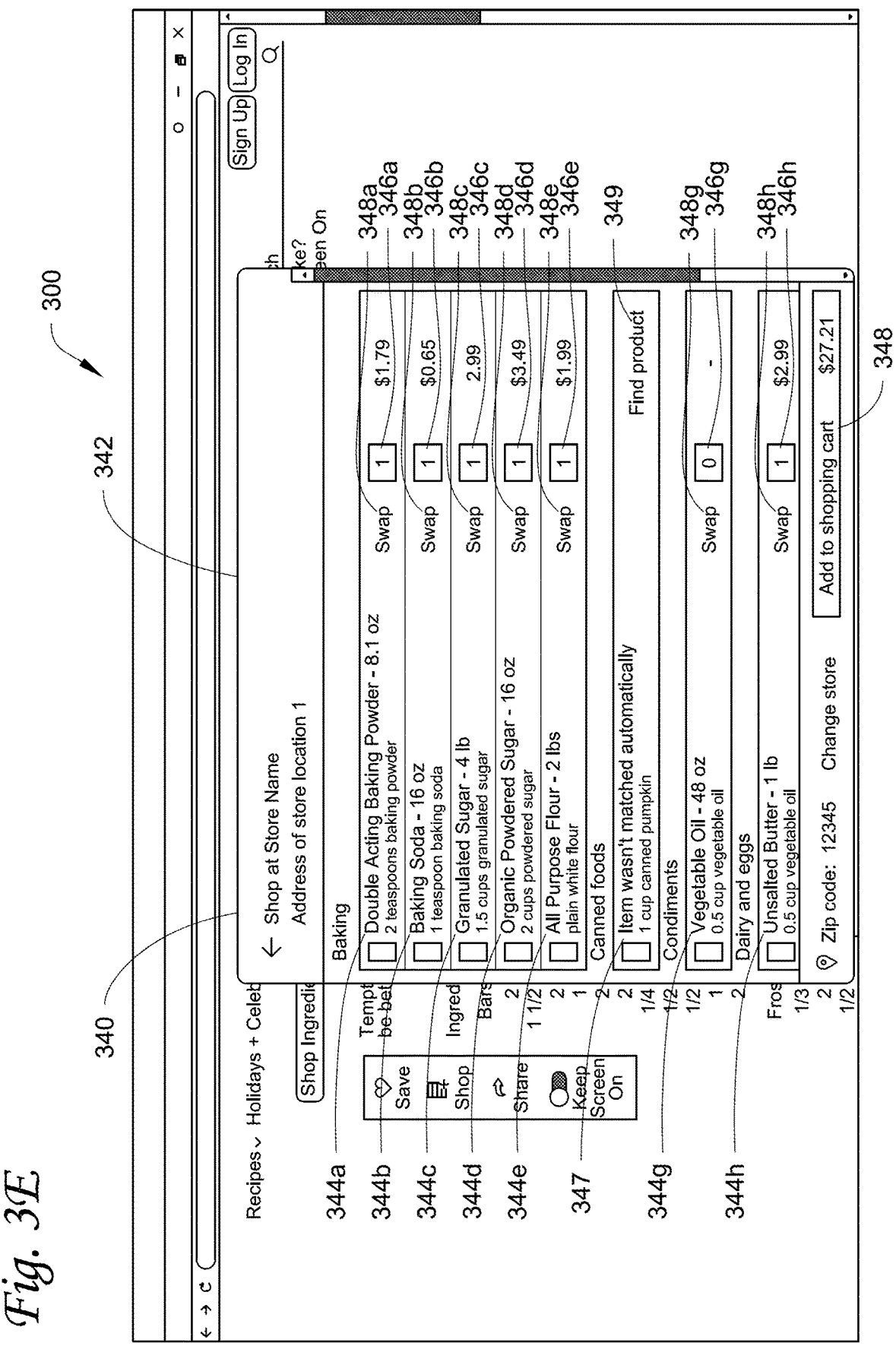
Figure 3F:
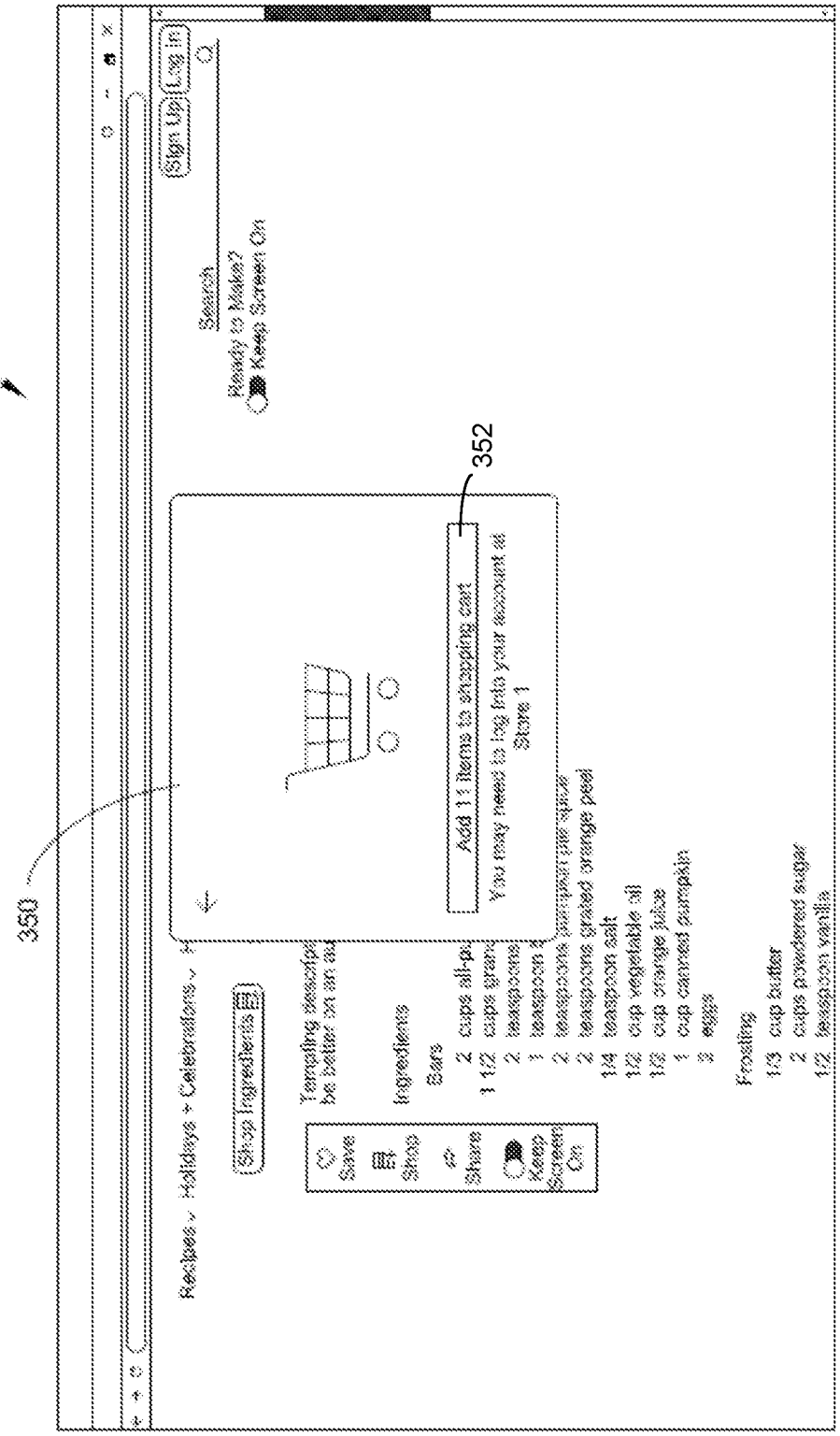
Figure 4:
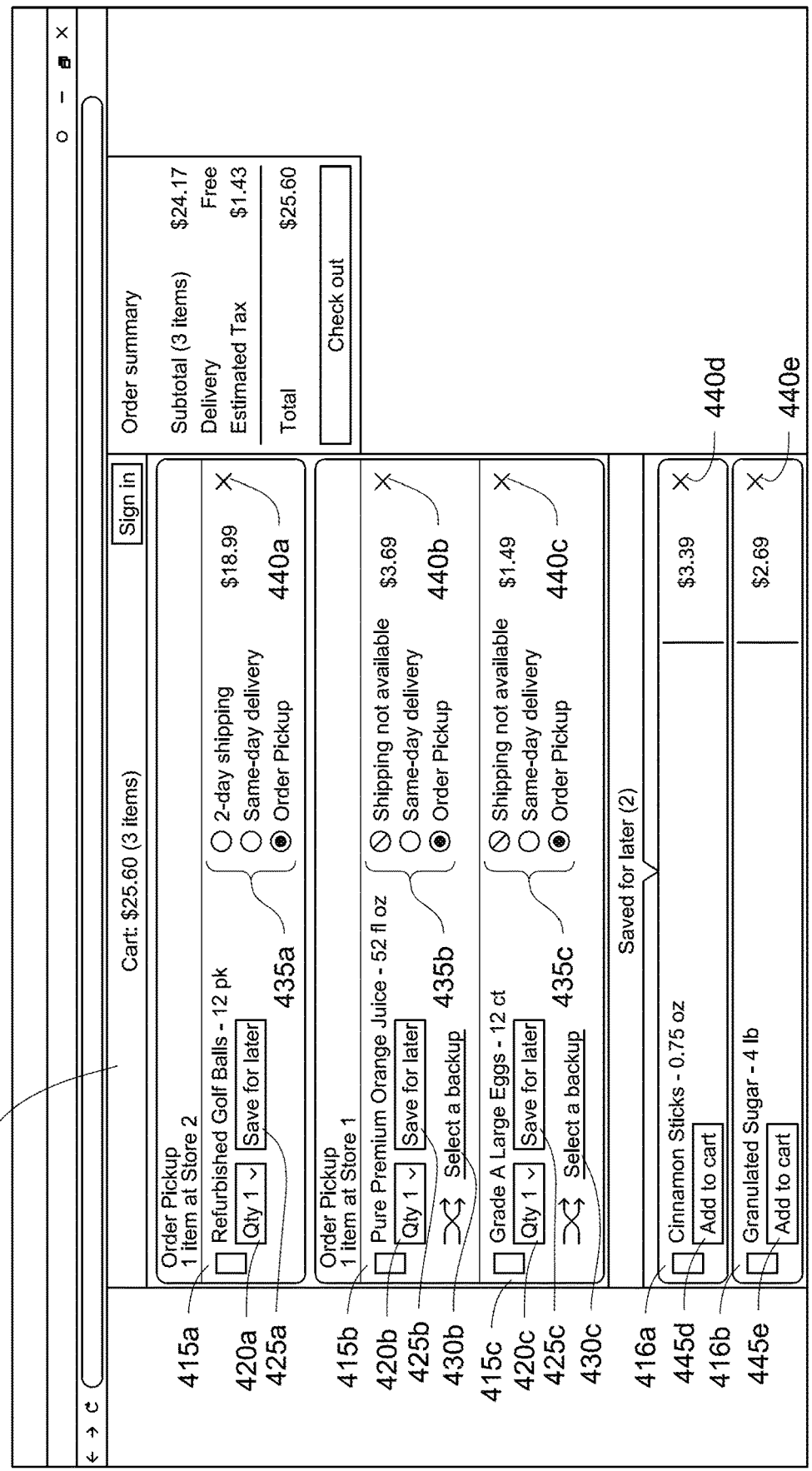
FIG. 4 illustrates a screenshot of a retailer GUI, according to one embodiment.

FIGS. 3A-4 are screenshots of an affiliate GUI 300 and a retailer GUI 400 implementing the method 200 using the system 10 described above, according to one embodiment. In particular, FIGS. 3A-F illustrate the affiliate GUI 300 prior to the user being transferred to the retailer GUI 400. The embodiment shown in FIGS. 3A-4 are for illustrative purposes only and is not intended to be limiting in any way.

FIG. 3A illustrates the affiliate GUI 300 showing a recipe for making a baked goods item. The recipe includes the ingredients needed to make the baked goods item. The recipe also includes a quantity amount of each of the ingredients. The GUI 300 includes various user selectable links 305 including a "Shop" link 305b that allows the user to purchase the ingredients needed to make the baked goods item.

FIG. 3B illustrates the affiliate GUI 300 upon selection of the "Shop" link 305b. A shopping list window 310 is provided that includes all of the items 312 required for making the baked goods item recipe shown in FIG. 3A. Each of the items 312 has an associated delete link 314 that allows the user to remove the associated item 312 from the shopping list window 310. As shown in FIG. 3B, each of the items 312 can also list the quantity required for making the recipe. For example, item 314f is granulated sugar and lists 1 ½ cups as the quantity required to make the recipe. The shopping list window 310 also includes a text input 316 that allows the user to search and add one or more additional items to the shopping list window 310. The shopping list window 310 also includes selectable links 318 including a "Shop Online" link 318d. The "Shop Online" link 318d allows the user to choose which retailer from one or more potential retailers to purchase the items 312 shown in the shopping list window 310.

FIG. 3C illustrates the affiliate GUI 300 upon selection of the "Shop Online" link 318d. A retailer window 320 is provided that includes each of the retailers 322 that can be selected by the user to purchase the items shown in FIG. 3B. The retailer window 320 includes a zip code entry 324 displaying the zip code where the user is located. The list of retailers 322 available to the user can vary based on the zip code entry 324. In some embodiments, the zip code entry 324 can determine the zip code where the user is located based on cookie(s) (e.g., HTTP cookie(s)) stored on the user's device for the affiliate GUI 300. A zip code change link 326 is also provided that allows the user to change the zip code and thereby adjust the retailers 322 that may be available to the user. In this embodiment, the retailer 322a with the affiliate GUI 300 can implement the method 200 shown in FIG. 2. It will be appreciated that upon selection of the retailer 322a, the affiliate server 34 can initiate the method 200 shown in FIG. 2 and described above. This can include the retailer online service 20 receiving a request for an authentication token (e.g., an anonymous token or a guest account token) from the affiliate online service 30 and the GSP API 22 generating and returning the authentication token to the affiliate online service 30.

FIG. 3D illustrates the affiliate GUI 300 upon selection of the retailer 322a. A nearest store window 330 is provided that includes a list of nearby stores 332 of the retailer 322a. The user can select one of the nearby stores 332 that can be used to fulfill the order of the items 312 for purchase. The nearest store window 330 also includes a text filter entry 334 that allows the user to find a particular store to be used to fulfill the order of the items 312 for purchase.

FIG. 3E illustrates the affiliate GUI 300 upon selection of one of the nearby stores 332. An electronic shopping cart window 340 is provided that includes an electronic shopping cart display 342 that includes a plurality of products 344, with each of the products 344 corresponding to at least one of the items 312 curated by the affiliate GUI 300 and edited by the user (as shown in FIG. 3B). That is, each of the products 344 corresponds with a specific item 314 selected by the user (as shown in FIG. 3C) and available from the retailer 322. For example, in FIG. 3B the item 314d is sugar, the corresponding product 344d is Good & Gather™ organic sugar. Each of the products 344 includes a quantity entry 346, a swap link 348 and a price. The quantity entry 346 can be user adjustable and indicates the quantity of the product 344 to be added to the retailer electronic shopping cart. The default number in the quantity entry 346 of the product 344 can be selected by the affiliate GUI 310 so as to have at least the amount of the corresponding item 314 required to make the recipe. The user can adjust the quantity of the product 344 by changing the number in the quantity 346. However, in instances when the particular product 344 is not available at the particular nearby store 332 (as selected by the user), the default number in the quantity entry 346 can be zero and the text of product 344 can be modified to show that the product 344 is not available. For example, the text of product 344g for vegetable oil in FIG. 3E is grayed out and the quantity entry 346g is set to zero. In this instance, the quantity entry 346g can also be locked to prevent the user from adjusting the quantity as the product 344g is not available. The swap link 348 allows the user to replace the product 344 with another product. For example, if the user wanted to replace product 344d (listed in FIG. 3E as Good & Gather™ organic powdered sugar), the user can select swap link 348d which would then allow the user to substitute product 344d with another item, brand or quantity amount (e.g., Good & Gather™ organic dark brown sugar, etc.). The electronic shopping cart window 340 also includes an "Add to retailer cart" link 348 that allows the user to confirm and finalize the list of products 344 to be purchased from the retailer. It will be appreciated that the cart item API 23 is used to identify the plurality of products 344 shown in the electronic shopping cart window 340. When the cart item API 23 is not able to find a corresponding product with one of the items 314, the electronic shopping cart display 342 provides a listing 347 indicating that the item was not matched. The listing 347 includes a "find product" link 349 that can allow the user to manually search for a corresponding product using the cart item API 23 of the retailer online service 20.

FIG. 3F illustrates the affiliate GUI 300 upon selection of one of the "Add to retailer cart" link 348. A GUI transfer window 350 is provided that includes "Move to retailer" link 352 that allows the user to be transferred from the affiliate GUI 300 to a retailer GUI (e.g., the retailer GUI 400 shown in FIG. 4). In some embodiments, upon selection of the "Move to retailer" link 352, the retailer online service 20 can receive a request (including the authentication token) from the affiliate online service 30 to redirect the user device from the affiliate online service 30 to the retailer online service 20. Also, the retailer online service 30, via the electronic shopping cart API 25, can validate the authentication token prior to the user accessing an electronic shopping cart display of the retailer GUI 21.

FIG. 4 illustrates a retailer GUI 400 after being transferred from an affiliate GUI (e.g., the affiliate GUI 300 shown in FIGS. 3A-F) via the electronic shopping cart API 25. The retailer GUI 400 displays an electronic shopping cart 410 that includes products 415 available for purchase and products 416 currently saved for later purchase. Each of the products 415a-c includes a quantity entry 420, a "save for later" link 425, a fulfillment selection 435, a "remove product" selection 440, and a price. Products 415b and 415c also include a "backup selection" link 430. In this embodiment, the electronic shopping cart 410 is a combined electronic shopping cart that includes product 415a from a pre-existing electronic shopping cart linked to a guest account that is merged with products 415b,c that are from an anonymous electronic shopping cart curated by the affiliate online service 30. The quantity entry 420 can be user adjustable and indicates the quantity of the product 415 to be purchased. The default number in the quantity entries 420b,c of the product 415b,c were previously selected by the affiliate GUI 310 so as to have at least the amount of the corresponding item 314 required to make the recipe. The user can adjust the quantity of the products 415b,c by changing the number in the quantity 420b,c. The "save for later" link 425 allows the user to move the corresponding product 415 as one available for purchase to the list of products 416 that are saved for later purchase. The "backup selection" link 430 allows the user to identify another product sold by the retailer online service 20 in case the corresponding product 415b,c is not currently in stock. For example, there may be situations where retailer online service 20 may not have up to date information regarding the availability of the products 415b,c and may identify products 415b,c as currently available for purchase when the products 415b,c are currently out of stock. It will be appreciated that for some products (e.g., product 415a), a backup selection may not be available and thus a "backup selection" link 430 may not be provided for the particular product. The fulfillment selection 435 allows a user to select how the purchased product 415 should be fulfilled. For example, as shown in FIG. 4, the fulfillment selection 435 can allow the user to select between 2-day shipping, same day delivery, or order pickup fulfillment options. In some instances, one or more of the fulfillment options may not be available with respect to certain products (e.g., products 415b,c). The retailer GUI 400 can gray out and/or prevent user selection of the particular fulfillment option that is not available. For fulfillment selections 435b,c, shipping is not available and thus the shipping fulfillment option is grayed out and only the order pickup fulfillment option is available. The "remove product" selection 440 allows the user to remove any of the products 415, 416 from the electronic shopping cart 410. The products 416 can be products that the user moved from the products 415 available for purchase by selecting the "save for later" link 425 or can be products that are not currently available at the retailer store location currently associated with the electronic shopping cart 410. The products 416 each include an "add to cart" link 445 that allows the user to move the particular product 416 back to the list of products 415 that are available for purchase. In some embodiments, it will be appreciated that the retailer online service 30 will have validated an authentication token from the affiliate online service 30 prior to the electronic shopping cart 410 being displayed on the user device.

Figure 5:
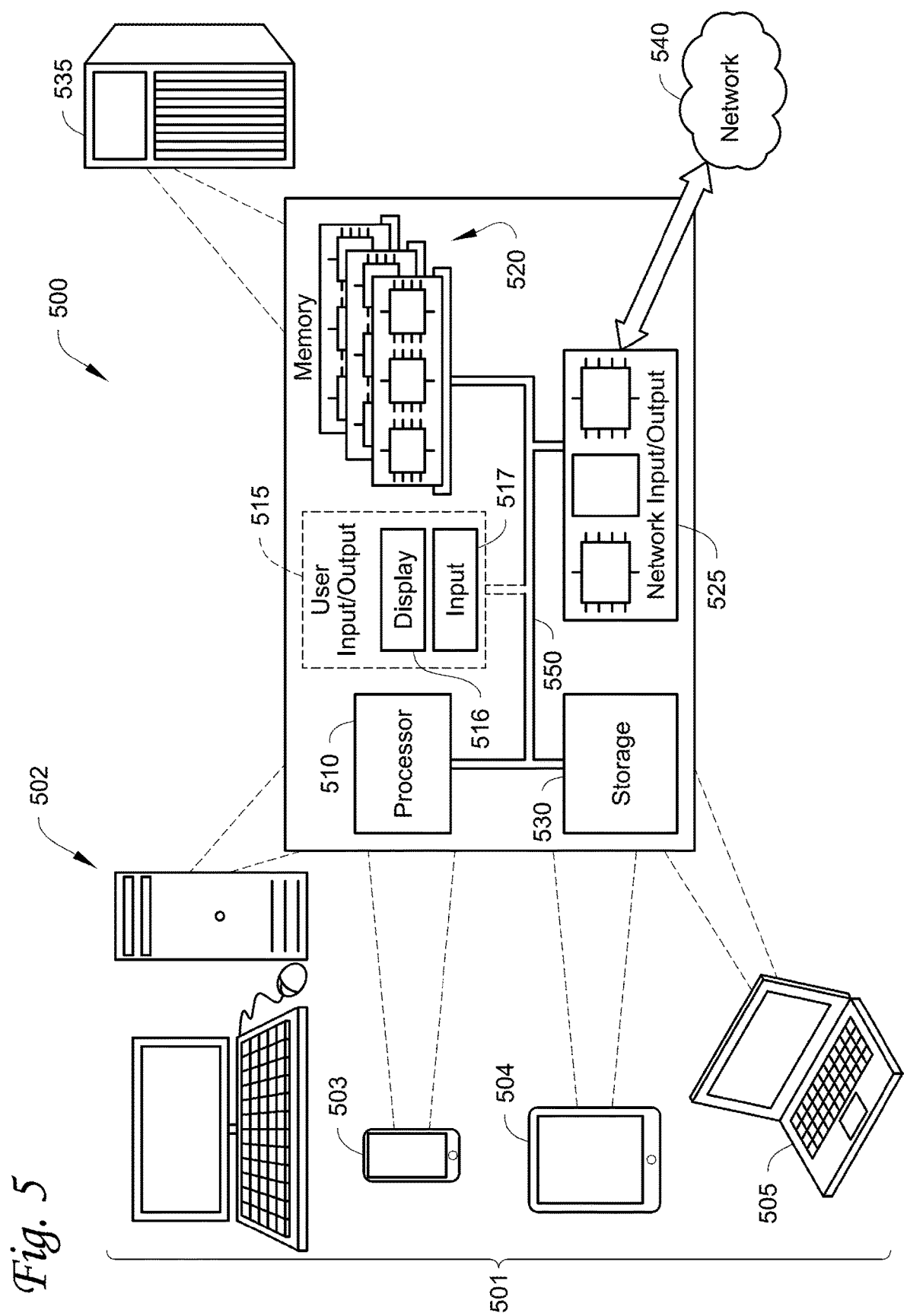
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a wearable device, a personal digital assistant (PDA), a video game console, a television, or the like. In an embodiment, the user devices 501 can alternatively be referred to as client devices 501. In such an embodiment, the client devices 501 can be in communication with the server device 535 through the network 540. One or more of the client devices 501 can be in communication with another of the client devices 501 through the network 540 in an embodiment.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In an embodiment, the processor 510 can be a multi-threaded processor.

The user I/O 515 can include a display 516 and/or an input 517, according to an embodiment. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In an embodiment, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In an embodiment, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering an online service (e.g., a website, an app, etc.) on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for securely transferring and merging an electronic shopping cart curated by an affiliate online service comprising an affiliate server and an affiliate graphical user interface (GUI) for purchase on a retailer online service, the method comprising:

the affiliate online service determining that a first user has linked a first account from the affiliate online service to the retailer online service;

a guest security platform (GSP) application programming interface (API) of the retailer online service receiving, over a network, a request for a guest account token from the affiliate online service that includes information regarding a user, upon the affiliate online service determining that the first user has linked the first account from the affiliate online service to the retailer online service, wherein the guest account token is cryptographically signed to prevent forgery;

the GSP API generating the guest account token in response to receiving the request for the guest account token from the affiliate online service, the guest account token generated by the GSP API linked to the first user based on a first guest account of the retailer online service, the guest account token including guest account token information regarding the affiliate online service and the first user, the guest account token information including:

affiliate online service information;

identifying information that links the first user to the first guest account of the retailer online service;

and a guest permission level indicating permitted functionality and restricted functionality of a cart item API of the retailer online service, the permitted functionality including permitting the cart item API to add payment information on behalf of the first user to a first pre-existing electronic shopping cart linked to the first guest account;

the GSP API sending, over the network, the guest account token to the affiliate online service;

the cart item API of the retailer online service receiving, over the network, one or more products from the affiliate online service to add to the first pre-existing electronic shopping cart linked to the first guest account;

the cart item API adding the one or more products to the first pre-existing electronic shopping cart;

the cart item API informing the affiliate online service that the one or more products have been successfully added to the first pre-existing electronic shopping cart;

the affiliate online service receiving a first redirection request from the first user via a first user device;

the first user device being automatically redirected from the affiliate online service to the retailer online service with the guest account token, upon the affiliate online service receiving the first redirection request from the first user via the first user device;

the GSP API validating the guest account token;

upon the GSP API validating the guest account token, the first user, via the first user device, accessing an electronic shopping cart display of a retailer GUI, and the retailer GUI determining whether the first user has already logged onto the retailer online service;

the retailer GUI determining that the first user has not already logged onto the retailer online service;

the retailer GUI requesting the first user to log onto the retailer online service upon the retailer GUI determining that the first user has not already logged onto the retailer online service;

the retailer GUI initiating a shopping cart API to retrieve and display the first pre-existing electronic shopping cart on the first user device;

the affiliate online service determining that a second user has not linked a second account from the affiliate online service to the retailer online service;

the GSP API of the retailer online service receiving, over the network, a request for an anonymous token from the affiliate online service that does not include information regarding the second user, upon the affiliate online service determining that the second user has not linked the second account from the affiliate online service to the retailer online service, wherein the anonymous token is cryptographically signed to prevent forgery;

the GSP API generating the anonymous token in response to receiving the request for the anonymous token from the affiliate online service, the anonymous token generated by the GSP API including affiliate online service information regarding the affiliate online service, the affiliate online service information including an affiliate client identifier and an anonymous permission level different from the guest permission level of the guest account token, wherein the anonymous token does not include the identifying information that links the second user to a second guest account of the retailer online service, and wherein the guest permission level indicates permitted functionality and restricted functionality of the cart item API of the retailer online service, the restricted functionality including restricting the cart item API from adding payment information to an anonymous electronic shopping cart on behalf of the second user;

the GSP API sending, over the network, the anonymous token to the affiliate online service;

the cart item API of the retailer online service receiving, over the network, one or more products to add to the anonymous electronic shopping cart from the affiliate online service;

the cart item API adding the one or more products to the anonymous electronic shopping cart;

the affiliate online service receiving a second redirection request from the second user via a second user device;

the second user device being automatically redirected from the affiliate online service to the retailer online service with the anonymous token, upon the affiliate online service receiving the second redirection request from the second user via the second user device;

the GSP API validating the anonymous token;

upon the GSP API validating the anonymous token, the second user, via the second user device, accessing the electronic shopping cart display of the retailer GUI, and the retailer GUI accessing a cookie associated with the retailer online service and stored in the second user device;

the retailer GUI, based on the cookie, obtaining the identifying information that links the second user to the second guest account of the retailer online service and determining that the second user, via the second guest account, has a second pre-existing electronic shopping cart linked to the second guest account;

upon determining that the second user has the second pre-existing electronic shopping cart linked to the second guest account, a cart-merge API creating a combined electronic shopping cart by transferring and merging one or more products of the second pre-existing electronic shopping cart linked to the second guest account with the one or more products of the anonymous electronic shopping cart without the affiliate online service accessing or being provided the cookie;

upon the cart-merge API creating the combined electronic shopping cart, the retailer GUI initiating the shopping cart API to retrieve and display the combined electronic shopping cart on the second user device without the affiliate online service accessing or being provided the cookie, wherein displaying the combined electronic shopping cart includes the retailer GUI displaying each of the one or more products of the second pre-existing electronic shopping cart and each of the one or more products of the anonymous electronic shopping cart on the second user device.

2. The method of claim 1, wherein the GSP API generating the anonymous token includes the GSP API requesting a GSP service that is part of the retailer online service to generate the anonymous token.

3. The method of claim 1, further comprising upon the retailer GUI determining that the second user does not have the second pre-existing electronic shopping cart linked to the second guest account with the retailer online service, the retailer GUI initiating the shopping cart API to retrieve and display the anonymous electronic shopping cart on the second user device.

4. The method of claim 1, wherein the anonymous token further comprises a privilege level allowing the affiliate online service to add, via the cart item API, fulfillment options of the anonymous electronic shopping cart on behalf of the second user.

5. The method of claim 1, further comprising the cart-merge API adjusting at least one of a delivery location, a delivery time window, a store pickup location, and a store pickup time based on user preferences stored in the cookie.

6. The method of claim 1, further comprising the cart item API automatically adjusting any of the one or more products to be added to the anonymous electronic shopping cart based on availability for purchase on the retailer online service.

7. The method of claim 1, further comprising the cart item API preventing the affiliate online service from adding a product that requires user age validation.

8. The method of claim 1, further comprising:

the GSP API not validating the anonymous token upon determining at least one of the anonymous token being expired, the anonymous token being tampered, and the anonymous token including an incorrect affiliate client identifier and/or affiliate password; and the retailer online service sending a notification to the affiliate online service that the anonymous token was not validated.

9. A system for securely transferring and merging an electronic shopping cart curated by an affiliate online service for purchase on a retailer online service, the system comprising:

the affiliate online service comprising an affiliate server and an affiliate graphical user interface (GUI) performing operations comprising:

determining that a first user has linked a first account from the affiliate online service to the retailer online service;

determining that a second user has not linked a second account from the affiliate online service to the retailer online service;

receiving a first redirection request from the first user via the first user device; and receiving a second redirection request from the second user via the second user device;

the retailer online service that includes:

a guest security platform (GSP) application programming interface (API) configured to:

receive, over a network, a request for a guest account token from the affiliate online service that includes information regarding the first user upon the affiliate online service determining that the first user has linked a first account from the affiliate online service to the retailer online service, wherein the guest account token is cryptographically signed to prevent forgery, generate the guest account token in response to receiving the request for the guest account token from the affiliate online service, the guest account token generated by the GSP API linked to the first user based on a first guest account of the retailer online service, the guest account token including guest account token information regarding the affiliate online service and the first user, the guest account token information including:

affiliate online service information;

identifying information that links the first user to the first guest account of the retailer online service;

and a guest permission level indicating permitted functionality and restricted functionality of a cart item API of the retailer online service, the permitted functionality including permitting the cart item API to add payment information on behalf of the first user to a first pre-existing electronic shopping cart linked to the first guest account;

send, over the network, the guest account token to the affiliate online service;

receive, over the network, a request for an anonymous token from the affiliate online service that does not include information regarding the second user upon the affiliate online service determining that the second user has not linked second account from the affiliate online service to the retailer online service, wherein the anonymous token is cryptographically signed to prevent forgery, generate the anonymous token in response to receiving the request for the anonymous token from the affiliate online service, the anonymous token generated by the GSP API including affiliate online service information regarding the affiliate online service, the affiliate online service information including an affiliate client identifier and an anonymous permission level different from the guest permission level of the guest account token, wherein the anonymous token does not include the identifying information that links the user to the guest account of the retailer online service, and wherein the guest permission level indicates permitted functionality and restricted functionality of the cart item API of the retailer online service, the restricted functionality including restricting the cart item API from adding payment information to an anonymous electronic shopping cart on behalf of the second user, and send, over the network, the anonymous token to the affiliate online service;

the cart item API configured to:
receive, over the network, one or more products from the affiliate online service to add to the first pre-existing electronic shopping cart linked to the first guest account,
add the one or more products to the first pre-existing electronic shopping cart;
inform the affiliate online service that the one or more products have been successfully added to the first pre-existing electronic shopping cart;
receive, over the network, one or more products to add to an anonymous electronic shopping cart from the affiliate online service, and
add the one or more products to the anonymous electronic shopping cart;

a cart-merge API configured to transfer and merge the one or more products added to the anonymous electronic shopping cart with a second pre-existing electronic shopping cart linked to a second guest account;

a shopping cart API configured to retrieve and display an electronic shopping cart on the first user device or the second user device; and a retailer GUI configured to allow the first user, via the first user device or the second user, via the second user device, to shop for and purchase one or more products from the retailer online service;

wherein the first user device is automatically redirected from the affiliate online service to the retailer online service with the guest account token, upon the affiliate online service receiving the first redirection request from the first user via first the user device, wherein the second user device is automatically redirected from the affiliate online service to the retailer online service with the anonymous token, upon the affiliate online service receiving the second redirection request from the second user via the second user device, wherein the GSP API is configured to validate the guest account token;

upon the GSP API validating the guest account token, the first user, via the first user device, accessing an electronic shopping cart display of the retailer GUI, and the retailer GUI determining whether the first user has already logged onto the retailer online service;

wherein the retailer GUI determines that the first user has not logged onto the retailer online service;

wherein the retailer GUI is configured to request the first user to log onto the retailer online service upon the retailer GUI determining that the first user has not logged onto the retailer online service;

wherein the retailer GUI is configured to initiate the shopping cart API to retrieve and display the first pre-existing electronic shopping cart on the first user device;

wherein the GSP API is configured to validate the anonymous token;

upon the GSP API validating the anonymous token,
the second user, via the second user device, accessing the electronic shopping cart display of the retailer GUI, and the retailer GUI accessing a cookie associated with the retailer online service and stored in the second user device;
the retailer GUI obtaining, based on the cookie, the identifying information that links the second user to the second guest account of the retailer online service;
the retailer GUI determining that the second user, via the second guest account, has the second pre-existing electronic shopping cart linked to the second guest account, wherein, upon determining that the second user has the pre-existing shopping cart linked to the second guest account, the cart-merge API creates a combined electronic shopping cart by transferring and merging one or more products of the second pre-existing electronic shopping cart linked to the second guest account with the one or more products of the anonymous electronic shopping cart without the affiliate online service accessing or being provided the cookie; and wherein, upon the cart-merge API creating the combined electronic shopping cart, the retailer GUI is configured to initiate the shopping cart API to retrieve and display the combined electronic shopping cart on the second user device without the affiliate online service accessing or being provided the cookie, wherein displaying the combined electronic shopping cart includes the retailer GUI displaying each of the one or more products of the second pre-existing electronic shopping cart and each of the one or more products of the anonymous electronic shopping cart on the second user device.

10. The system of claim 9, wherein to generate the anonymous token, the GSP API is configured to request a GSP service that is part of the retailer online service to generate the anonymous token.

11. The system of claim 9, wherein upon determining that the second user does not have the second pre-existing electronic shopping cart linked to the second guest account, the retailer GUI is configured to initiate the shopping cart API to display the anonymous electronic shopping cart on the second user device.

12. The system of claim 9, wherein the anonymous token further comprises a privilege level configured to allow the affiliate online service to add, via the cart item API, fulfillment options of the anonymous electronic shopping cart on behalf of the second user.

13. The system of claim 9, wherein the affiliate online service further performs operations comprising: sending a request for the anonymous token that does not include information regarding the second user to the retailer online service; receiving the anonymous token via the GSP API; sending one or more products to the retailer online service to curate the anonymous electronic shopping cart with the retailer online service; and redirecting the second user device from the affiliate online service to the retailer online service with the anonymous token.

14. The system of claim 13, wherein the affiliate online service is configured to add fulfillment options of the anonymous electronic shopping cart on behalf of the second user via the cart item API.

15. The system of claim 9, wherein the cart-merge API is configured to adjust at least one of a delivery location, a delivery time window, a store pickup location, and a store pickup time based on user preferences stored in the cookie.

16. The system of claim 9, wherein the cart item API is configured to automatically adjust any of the one or more products to be added to the anonymous electronic shopping cart based on availability for purchase on the retailer online service.

17. The system of claim 9, wherein the cart item API is configured to prevent the affiliate online service from adding a product that requires user age validation.

18. The system of claim 9, wherein the GSP API is configured to not validate the anonymous token upon determining at least one of the anonymous token being expired, the anonymous token being tampered, and the anonymous token including an incorrect affiliate client identifier and/or affiliate password; and the retailer online service is configured to send a notification to the affiliate online service that the anonymous token was not validated.

\* \* \* \* \*